(12) United States Patent  
Canon et al.

(10) Patent No.: US 7,515,338 B2  
(45) Date of Patent: Apr. 7, 2009

(54) METHOD FOR OPERATING A MOTORIZED SCREEN

(75) Inventors: Sylvain Canon, Grenoble (FR); Celine Noir, La Roche-sur-Foron (FR); Jean-Pierre Cathala, Burdignin (FR); Eric Guillemot, Scionzier (FR)

(73) Assignee: Somfy SAS, Cluses (FR)

( * ) Notice: Subject to any disclaimer, the term of this patent is extended or adjusted under 35 U.S.C. 154(b) by 414 days.

(21) Appl. No.: 11/249,973

(22) Filed: Oct. 13, 2005

(65) Prior Publication Data

US 2006/0098278 A1     May 11, 2006

(30) Foreign Application Priority Data

Oct. 25, 2004   (FR) ................................... 04 11349

(51) Int. Cl.
    *G03B 21/56*    (2006.01)
    *A47G 5/02*    (2006.01)

(52) U.S. Cl. ........................ 359/461; 160/310

(58) Field of Classification Search ................. 359/461; 160/310

See application file for complete search history.

(56) References Cited

U.S. PATENT DOCUMENTS 4,665,965 A    5/1987   Pasquier et al.
6,922,284 B1 *   7/2005   Hou .......................... 359/443
7,042,640 B2 *   5/2006   Devos et al. ................ 359/443

FOREIGN PATENT DOCUMENTS

EP     1 319 795 A    6/2003
FR     2 573 551 A    5/1986
JP     2001-173347    6/2001

* cited by examiner

*Primary Examiner*—Christopher E Mahoney
(74) *Attorney, Agent, or Firm*—Frommer Lawrence & Haug LLP; Ronald R. Santucci

(57) ABSTRACT

The method applies to a motorized screen device comprising a screen windable on a winding tube, and at least one means for latching the free end of the screen defining a position termed latched in the direction of winding, the latching being activated in this direction if the free end of the screen previously reaches at least one position of reversal, to which corresponds for the unwinding a value of angular position of the winding tube termed the position of reversal of rotation, situated beyond the latched position in the direction of unwinding of the screen. According to the method, in a mode of configuration of the latching of the screen, the installer proceeds merely to record the value of a chosen angular position, termed the recorded rotation reversal position, this position being situated at the level of or beyond the position of reversal of rotation, in the direction of unwinding of the screen.

10 Claims, 2 Drawing Sheets

Load bar locked at PM but actuator continues to unwind the fabric. Reversal of direction until the fabric is slightly stretched.

METHOD FOR OPERATING A MOTORIZED SCREEN

This application claims priority benefits from French Patent Application No. 04 11349 filed Oct. 25, 2004.

BACKGROUND OF THE INVENTION

The invention relates to a method for operating a motorized screen device comprising a screen windable on a winding tube whose angular position is measured by a sensor, and at least one means of latching of the free end of the screen defining a position termed latched position in the direction of winding, the latching being activated in this direction if the free end of the screen previously reaches at least one position of reversal, to which corresponds for the unwinding a value of angular position of the winding tube termed the position of reversal of rotation, situated beyond the latched position in the direction of unwinding of the screen. The invention also relates to a motorized screen device for the implementation of such a method.

DESCRIPTION OF THE PRIOR ART

Known screen devices comprise a windable element fixed on the one hand to a winding tube around which the latter is wound and on the other hand to a rigid bar termed the load bar, the load bar generally being guided by its ends in rails situated on either side of an opening to be masked. Screen devices also comprise a means of latching making it possible to maintain the load bar in a determined position so as to prevent the latter from lifting or banging under the actions of the wind and to prevent the windable element from flapping in the wind.

Usually, during the unwinding of the windable element, the load bar enters the latching means and pursuant to a reverse movement, that is to say to an unwinding movement, locks in the latching means. To unlatch and open the screen again, it is necessary firstly to displace the screen in the direction of unwinding as far as a certain position before being able to wind up the screen.

These various displacements may be performed manually, that is to say by the action of forces caused by the user and applied to the windable element, or be performed in a motorized manner, that is to say by the action of forces caused by an actuator and applied to the windable element.

In the latter case, the actuator is generally placed in the winding tube and responds to commands emanating from a user by way of a control interface. The actuator comprises electrical or electronic means of managing the movement of the screen as a function of the orders received and as a function of events detected. These electrical or electronic means may, in order to do this, operate jointly with sensors of position, of torque or of displacement time. Together, these means constitute a control unit.

Such devices are described for example in the following documents: FR 2 573 551, EP 1 319 795 and JP 2001-173347.

Application FR 2 573 551 discloses a motorized shutter device comprising a means of latching and a load bar whose ends slide in glideways. A first position and a second position of the load bar are tagged and the passage of the load bar through these positions causes the toggling of switches.

The first position corresponds to a top position of reversal of direction, that is to say to a position in which, on entering the latching means, a reversal of the direction of displacement causes locking of the shutter and more particularly locking of the rotation of the slats of the shutter.

The second position corresponds to a bottom position of arrest in the latching means. These positions are defined by a mechanical counting device with manual adjustment and are managed as end-of-travel positions.

Document JP 2001-173347 describes a motorized shutter device comprising latching means. The passage of the load bar of the device to a height level with these latching means causes the toggling of the latching means. The movement of the shutter is continued as far as a bottom position, then reversed. The toggled latching means then lock the opening movement. The latching position can be sensed by sensors, the position of reversal of movement by a torque detection.

Patent application EP 1 319 795 discloses a method of learning the positions of a latching device making it possible to automatically manage the movements of a windable element comprising a load bar as a function of the orders received from the user. The learning method defines several significant positions. A first position corresponds to the top end of travel of the windable element, a second position corresponds to the so-called latching position, a third position corresponds to the position in which the movement of the screen must be reversed so as to activate the latching means and a fourth position corresponds to the so-called unlatching position below which it is necessary to move so as to unlatch the windable element.

During a down movement, the load bar of the windable element leaves from the first position and goes down toward the third position situated in the latching means. In this third position, the movement of the windable element is stopped and then reversed until the second position is reached. In this position, the load bar is locked in the latching means and the up movement cannot be continued. At this moment, the windable element is stressed and may not be lifted or inflated by the wind.

To unlatch the windable element, it is then necessary to unwind the element until a fourth position before being able to reverse the displacement, that is to say wind the element up.

Thus, to configure the device, the installer must displace the element until the load bar has entered the latching means in a position lying between the second and fourth position. There, the installer must instruct a reversal of the direction of the displacement of the load bar so as to direct it toward the second position and determine, by overtorque detection, this position before recording it automatically. The third and fourth positions are determined subsequently. The description remains very vague however on the manner of determining these positions.

The latching means currently used are of small size, thus the distances separating the second, third and fourth positions are reduced. This characteristic is a problem for the implementation of the method described previously. Specifically, on account of these small distances, it is very difficult for the installer, during the installation of the device, to bring the windable element directly into a position lying between the second and the fourth position. Consequently, the installer very often has to repeat a displacement of the windable element in the down direction as far as the latch in order to succeed in stopping the screen in a desired position. Specifically, if the fourth position is passed, it is necessary to return to a starting position situated between the first and the second position to be able to configure the device.

Additionally, more and more latching means of the "open" type are being used. This type of latching means makes it possible to allow the load bar to pass freely through it when no reversal of direction of displacement is instructed. Consequently, these latching means may be installed anywhere along the guideways of the load bar and make it possible to define intermediate latching positions. Thus, the windable element can for example be latched midway along its travel so as to cover only the upper part of the opening equipped with it.

With respect to the prior art cited in this document, the method of learning makes it possible to determine the positions without having to define the displacements between the first position and the fourth position, via the second and third positions.

SUMMARY OF THE INVENTION

The aim of the invention is to provide a method for operating a motorized screen device making it possible to alleviate the drawbacks cited and making it possible to improve the methods of operation known from the prior art. In particular, the invention proposes a method of operation making it possible to make easier the procedures for configuring and adjusting the motorized screen device and to reduce the time required to complete them. The invention proposes in particular to make easier the procedures for defining the positions of the means of latching of the device.

The method of operation according to the invention is one wherein, in a mode of configuration of the latching of the screen, the installer proceeds merely to record the value of a chosen angular position, termed the recorded rotation reversal position, this position being situated at the level of or beyond the position of reversal of rotation, in the direction of unwinding of the screen.

Various modes of execution of the method are defined by the dependent claims 2 to 8.

The motorized screen device according to the invention comprises a screen windable on a winding tube whose angular position is measured by a sensor, and at least one means of latching of the free end of the screen defining a position termed latched position in the direction of winding, the latching being activated in this direction if the free end of the screen previously reaches at least one position of reversal, to which corresponds for the unwinding a value of angular position of the winding tube termed the position of reversal of rotation, situated beyond the latched position in the direction of unwinding of the screen. It is characterized in that it comprises hardware and software means for the implementation of the method of operation defined previously.

The motorized screen device may comprise a screen drive torque sensor.

DESCRIPTION OF THE DRAWINGS

The appended drawing represents an embodiment of a motorized screen device according to the invention and various modes of execution of the method of operation according to the invention.

DESCRIPTION OF THE PREFERRED EMBODIMENTS

Figure 1:
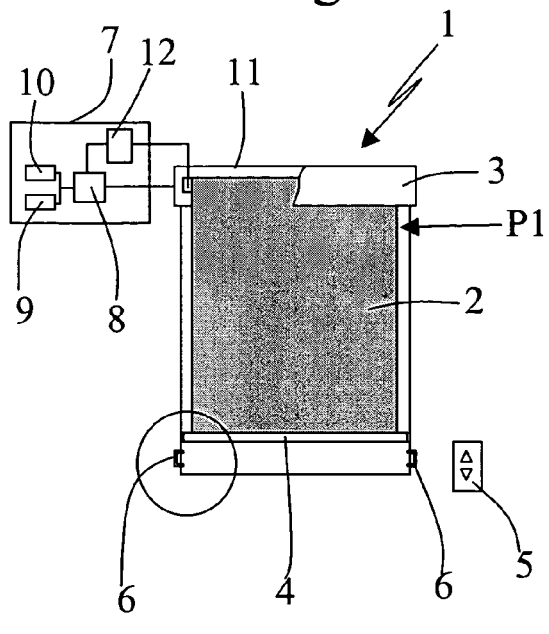
FIG. 1 is a diagrammatic view of a motorized screen device making it possible to implement the method of operation according to the invention.

A motorized screen device 1 is represented in FIG. 1. This device comprises a windable element 2 linked at one of its ends to a winding tube 3 and at the other of its ends, called the free end, to a load bar 4 whose ends are guided by guiding rails disposed in a building on either side of an opening that the windable element is intended to cover.

The displacements of the windable element 2 or screen are controlled by the rotational displacements of the winding tube 3. A tubular gear motor disposed inside the winding tube 3 allows the latter to be driven. The movements of the gear motor are controlled by a control unit 7 linked to the gear motor, to sensors 10, 12 and to a user interface 5 with which a user can control the movements of the windable element. The device comprises a sensor 12 of the angular position of the winding tube 3 and can also comprise a torque sensor 10 for sensing the torque exerted by the gear motor so as to detect obstacles and/or the ends of travel and a sensor of position of the load bar 4. The user interface 5 can be linked to the control unit 7 by wire-based or non-wire-based communication means (for example by RF waves or by infrared rays). The control interface 7 comprises in particular a logic processing unit 8 and a memory 9.

The windable element may in particular consist of a closure, shading or solar protection element. It may in particular consist of a fabric. The winding tube is preferably mounted above the opening that the windable element is intended to cover. The windable element is preferably wound in a casing 11 intended to protect it.

To simplify the description, the screen is considered to unwind downwards, in particular under the effect of its own weight. Other configurations are obviously possible.

Figure 6:
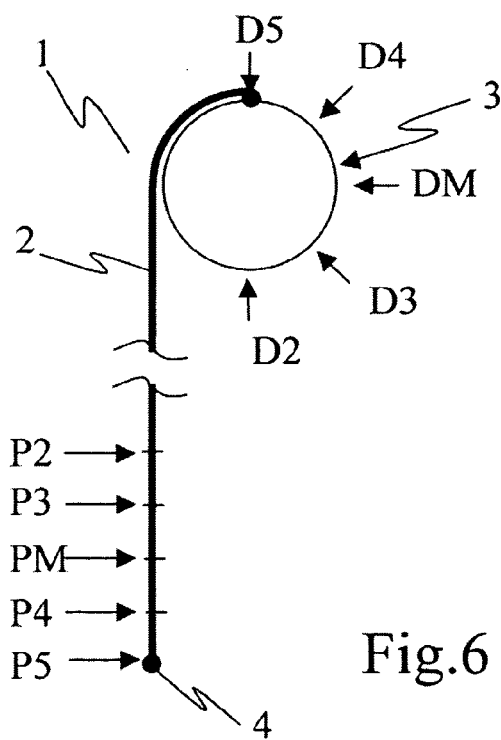
FIG. 6 is a diagram illustrating the correspondences between angular positions of a winding tube and positions of the free end of a screen.

A first position P1 of the load bar or of the free end of the element corresponds to a position of complete opening of the windable element. To this position corresponds an angular position D1 of the winding tube 3, as represented in FIG. 6.

Figure 2:
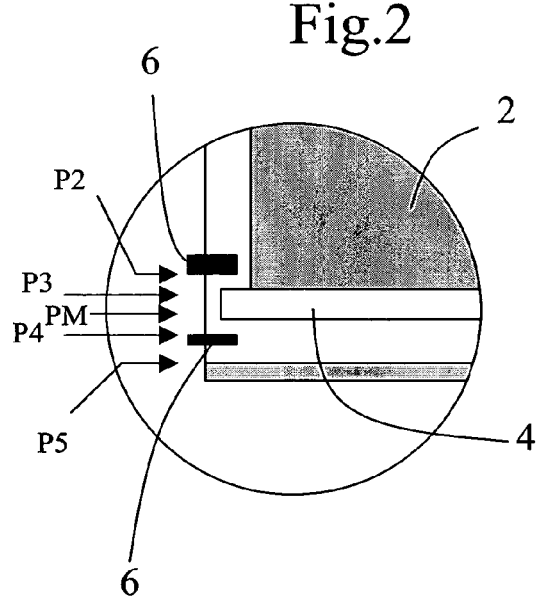
FIG. 2 is a diagrammatic detail view of a motorized screen device at the level of one of its latching means.

Along the guiding rails disposed on either side of the opening, the device comprises latching means 6. The latching means cooperate with the ends of the load bar. These latching means determine, as represented in FIG. 2, a second position P2 of the load bar, a third position P3 of the load bar and a fourth position P4 of the load bar. The second position P2 is a so-called latched position in which the windable element is locked, corresponding to a latched angular position D2 of the winding tube 3. The third position P3 is a so-called reversal position. When the load bar goes past this position P3 in the direction of unwinding of the element and when subsequently a winding movement of the element is instructed, the screen is again locked, the load bar being in position P2 and the winding tube in position D2. This position P3 corresponds to a reversal angular position D3 of the winding tube 3. The fourth position P4 is a so-called exit position below which the load bar having been latched must come so that the windable element can again be wound until it reaches its position of total opening P1. This position corresponds to an exit angular position D4 of the winding tube 3.

The position P4 is a lower position than the position P3, this position P3 being lower than the position P2.

During the latching configuration, a position PM of the load bar must be defined as must the corresponding position DM of the winding tube 3. These positions PM and DM must be chosen and recorded by the installer. The position PM is termed the recorded reversal position and the PM is termed the recorded reversal angular position DM.

The value dM of the position DM is used in the mode of use of the motorized screen. Specifically, when the user sends an order for closure and for latching of the load bar in position P2 to the screen device (in the closed position), the screen device firstly executes an action of rotation of the winding tube 3 in the direction of unwinding of the screen, then, when the position sensor 12 detects that the winding tube has reached the position DM (signifying that the load bar is in position PM), executes an action of stoppage of the movement of rotation of the winding tube. The screen device then immediately executes an action of rotation of the winding tube in the direction of winding until the position sensor detects that the tube has reached the position D2 (signifying that the load bar is locked in position P2).

The load bar may furthermore cross the latching means in the down direction as in the up direction without being latched if no reversal of its direction of displacement occurs between positions P3 and P4.

The positions PM must lie inside the means of latching in a zone in which a reversal of direction of displacement of the load bar from a down displacement to an up displacement causes the latching of the load bar, that is to say anywhere between positions P3 and P4. Outside of this zone, the reversal of direction of displacement of the load bar produces no particular effect.

Various types of latching means operating according to this principle may be used. It is in particular possible to use latching means such as those described, with reference to FIG. 3, in the passage from line 41, column 2, to line 42, column 3 of patent application EP 1 270 865 A2. It is also possible to use latching means such as those described in patent application EP 1 223 262 A1. The contents of these two applications are incorporated by reference into the present application.

Figures 3, 4:
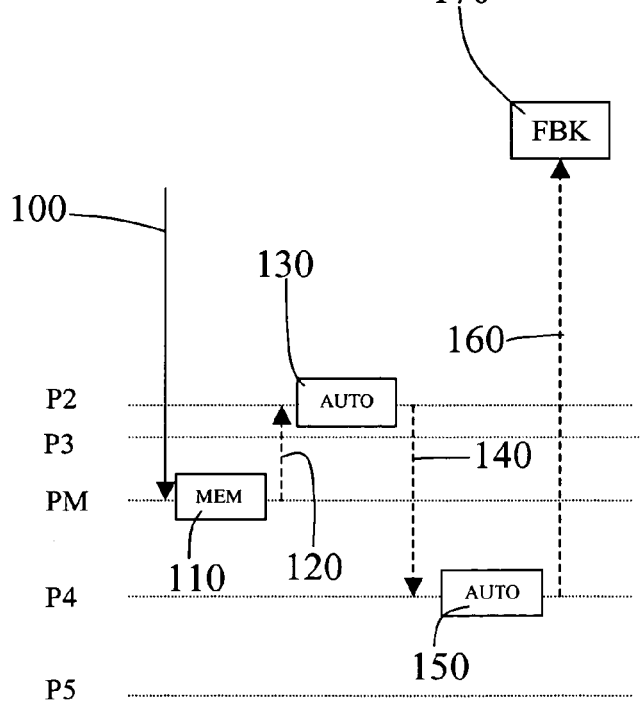
FIG. 3 is a diagram illustrating a process of a first mode of execution of the method of operation according to the invention.
FIG. 4 is a diagram illustrating a process of a second mode of execution of the method of operation according to the invention.

A first process for configuring the motorized screen device is represented in FIG. 3 and defines a first mode of execution of the method of operation according to the invention.

In a first step 100, the installer instructs by way of the user interface a down movement of the load bar, that is to say an unwinding movement of the windable element, or an up movement of the load bar, that is to say a winding movement of the windable element until the load bar is brought into the latching means and more precisely into the zone in which a reversal of the direction of displacement of the load bar, from a down movement to an up movement, causes a locking of the bar. This zone may be indicated by markings on the guiding rails or on the latching means, the load bar coming opposite these markings when it is in said zone. Having regard to this zone's restricted nature related to the character of the latching means, the installer may be compelled to attain this zone by trial and error, without however being compelled to re-emerge from the latch. This trial and error then corresponds to fine adjustments, through small down and up movements of the load bar.

Once the load bar is in the sought-after zone, in a step 110, the installer manually records the value dM of the angular position DM of the winding tube corresponding to the instant position PM of the load bar. This value dM is recorded in a memory of the motorized screen device control unit. The recording is instructed for example by a particular action on the user interface or by pressing a particular button of the user interface.

In a step 120, triggered automatically following the recording of the value dM, energization of the gear motor is instructed causing the winding of the windable element and consequently the raising of the load bar. This step could also follow an action by the installer.

In a step 130, the load bar reaches the position P2 in which it is locked by the latching means. This position is detected by the torque sensor and the energy supply to the gear motor is cut. The value d2 of the angular position D2 of the winding tube corresponding to the position P2 of the load bar is automatically recorded in memory in the motorized screen device control unit. The value d2 recorded may correspond to a position slightly lower than the position of locking of the load bar so that once in the mode of use, when a user instructs the closure of the screen, the load bar does not come into its locking position, exerting significant stresses on the latching means.

In a step 140, triggered automatically following the recording of the value d2, energization of the gear motor is instructed, causing the unwinding of the windable element and consequently the descending of the load bar. This step could also follow an action by the installer.

In a step 150, the load bar reaches the unlatching position P4. This so-called unlatched position may be detected by a detection of variation of the torque, the value d4 of angular position D4 of the winding tube corresponding to the position P4 is automatically recorded in a memory of the motorized screen device control unit. When this position is detected, a stoppage of the gear motor, by cutting off of the energy supply, is instructed. The position P4 may also be determined by knowing the position P2 and by knowing the type of latching means used. The type of latching means used may be stored in memory during installation or during the manufacture of the screen device. In the case where this position may be determined with these data, the value d4 is recorded in memory with the value d2 in step 130 and, during step 150, only a cutting off of the energy supply to the gear motor is instructed.

In a step 160, triggered automatically following step 150, an energizing of the gear motor is instructed, causing a reversal of direction with respect to the last direction of displacement and hence the winding of the windable element. Consequently, the load bar rises back to a position higher than the position P2.

In a step 170, triggered automatically following step 160, two energizings of the gear motor of short duration and in different directions are instructed, causing short back and forth movements of the load bar. These movements make it possible to acknowledge the recordings performed.

The device can then toggle into the mode of use.

The drawback of this process is that the confirmation signal occurs a relatively long time after the recording by the installer of the value dM corresponding to the position PM.

A second process for configuring the motorized screen device is represented in FIG. 4 and defines a second mode of execution of the method of operation according to the invention.

This process of configuration makes it possible to simplify the installation while assuring the installer that he has carried out the necessary actions properly.

In a first step 200, the installer instructs by way of the user interface a down movement of the load bar, to a position P5 lying below the unlatched position P4.

In a second step 210, the user instructs by way of the user interface an up movement of the load bar, until the latter is brought into the latching means and more precisely into the zone in which a reversal of the displacement of the load bar, from a down movement to an up movement, causes a locking of the bar. Having regard to this zone's restricted nature related to the character of the latching means, the installer may be compelled to attain this zone by trial and error. This trial and error then corresponds to fine adjustments of position, by small up and down movements of the load bar.

Once the load bar has halted in the sought-after zone, in a step 220, the installer manually records the value dM of angular position DM of the winding tube corresponding to the position PM of the load bar. This value dM is recorded in a memory of the motorized screen device control device. The recording may be instructed for example by a particular action on the user interface or by the pressing of a particular button of the user interface.

In a step 230, triggered automatically following step 220, energizing of the gear motor is instructed, causing the winding of the windable element and consequently the raising of the load bar to a position higher than the position P2.

In a step 240, triggered automatically following step 230, two energizings of the gear motor of short duration and in different directions are instructed, causing short back and forth movements of the load bar. These movements make it possible to very rapidly acknowledge that the recording of the value dM has been performed.

The device can then toggle into the mode of use, the other positions P2 and P4 not necessarily having to be learnt in the configuration mode.

Following the recording performed in step 110 or in step 220, the control unit itself determines which procedure has to be the next to be performed. This procedure may depend on several criteria, in particular:

- if the last displacement of the windable element was a down displacement, then the control unit causes a reversal of the direction of displacement and, if the last displacement of the windable element was an up displacement, then the control unit causes a new up movement,
- if the load bar is locked in the latching means, in a time window following the recording of the value dM corresponding to the position PM, the control unit deduces therefrom that it is dealing with the position P2,
- on particular actions performed for the configuration according to the first process or according to the second process,
- on the order given by the installer following the recording of the value dM.

The recording of the value of the position of reversal by the installer therefore makes it possible to configure the device in a simple manner, and in particular to bring the device into the position of reversal possibly by fine adjustments, from a position short of or beyond the latch.

Figure 5:
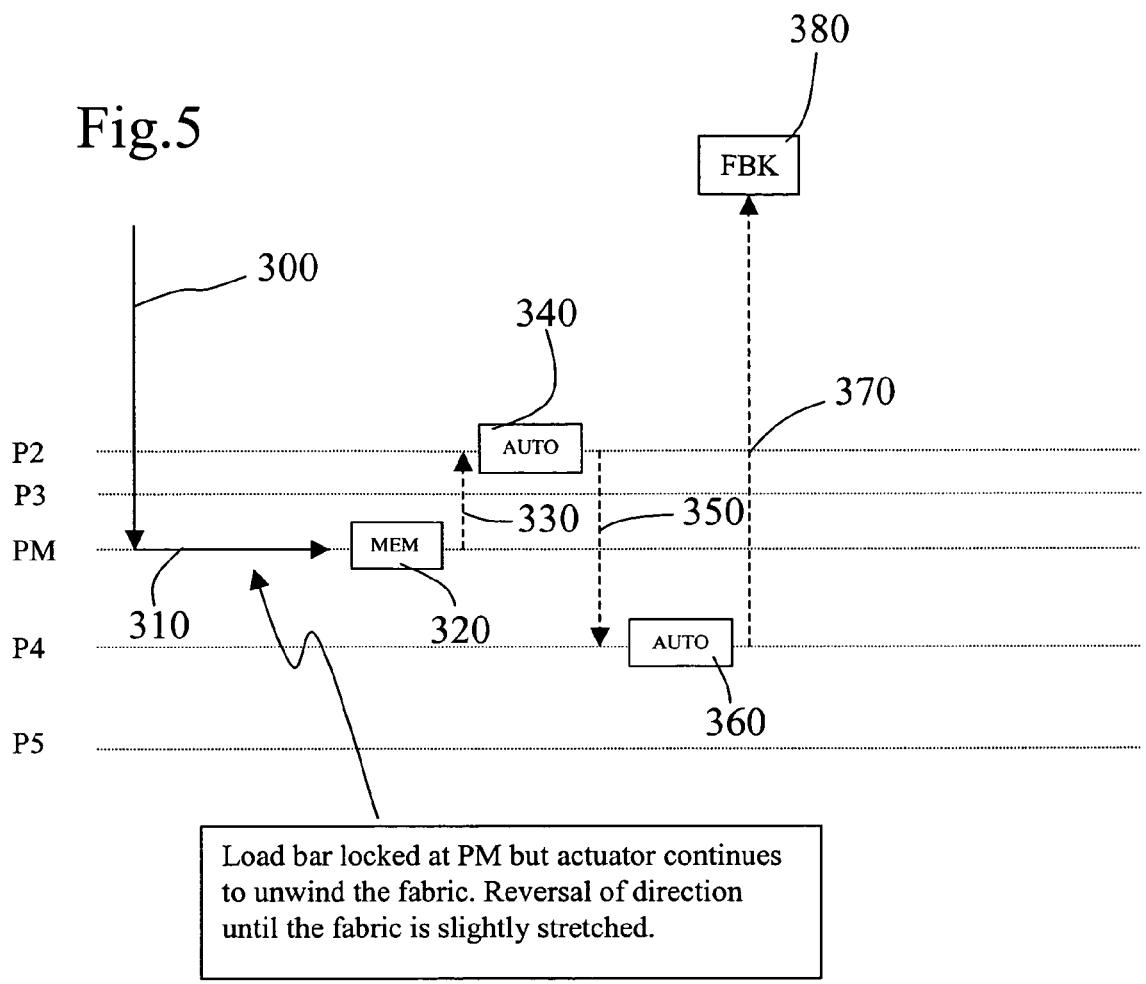
FIG. 5 is a diagram illustrating a process of a third mode of execution of the method of operation according to the invention.

A third process for configuring the motorized screen device is represented in FIG. 5 and defines a third mode of execution of the method of operation according to the invention, this mode being applicable to the latching means of "closed" types that is to say latching means below which the load bar cannot descend.

In a first step 300, the installer instructs by way of the user interface a down movement of the load bar, that is to say an unwinding movement of the windable element until the load bar is brought into the latching means in the position PM corresponding, having regard to the type of latching means, to a position of locking of the load bar. In this position, the windable element may however continue to be unwound and then wound, as ordered by the installer, as represented in step 310, so as to reach a position in which the load bar is in the position PM and in which the windable element is slightly stressed (especially in the case when the windable element is made of fabric).

Steps 320 to 380 of this mode of execution are identical to steps 110 to 170 of the first mode of execution.

The motorized screen device may then toggle into the mode of use.

The motorized screen device according to the invention may exhibit in memory various algorithms corresponding to the various configuration processes. The choice of the process used can for example revert to the installer. The existence of these various processes allows the installer to use the process making it possible to effect the configuration in the most effective possible manner.

In the mode of use, when an order to close the screen is instructed, the windable element is unwound until the load bar reaches the position PM, then the screen is wound so as to reach the position P2. If the value d2 corresponding to the position P2 is already recorded, the winding of the windable element is stopped as soon as the load bar reaches this position and, if the value d2 corresponding to the position P2 is not yet recorded, the winding of the windable element is instructed until the torque sensor detects a torque higher than a determined value signifying that the position P2 has been reached. In the latter case, the position P2 can then be recorded in memory. The load bar then remains locked in position until another order to move the screen is instructed.

When an order to wind the windable element is instructed, the windable element is firstly unwound until the load bar reaches the position P4. If the value d4 corresponding to the position P4 is already recorded, the unwinding of the windable element is stopped as soon as the load bar reaches this position and, if the value d4 corresponding to the position P4 is not yet recorded, the unwinding of the windable element is instructed until this position is detected automatically, for example if the torque sensor detects a decrease in load signifying that the position P4 has been reached. In the latter case, the value d4 corresponding to the position P4 can then be recorded in memory. The windable element can then be wound freely until the screen is fully opened or until a defined position.

If the motorized screen device comprises several means of latching at various locations on the guiding rails, making it possible to define intermediate positions, provision may be made such that if the user instructs a stoppage of the movement of the windable element while the load bar is in proximity to latching means, movements of winding and of unwinding are automatically performed, after this stop instruction, so as to lock the load bar in said latching means.

In the user mode, the recordings of the values d2, dM and d4 corresponding to the positions P2, PM and P4 may be regularly updated following, for example, a certain number of displacements of the load bar so as to take account of dispersions that may occur during use, in particular at the level of the play in the windable element's kinematic drive chain. In this case, the position P2 is determined by virtue of the torque sensor, the position PM is deduced from the position P2 (for example through a mathematical relation depending on the type of latching means used or the values previously recorded) and the position P4 is determined by virtue of the torque sensor or is deduced from the position P2 (for example through a mathematical relation depending on the type of latching means used or the values previously recorded).

The latching means used may also be of the type in which the crossing of the latching means by the load bar in a first direction does not bring about locking and in which the crossing of the latching means by the load bar in a second direction brings about locking. To unlatch the load bar, a slight movement of the latter in the first direction followed by a movement in the second direction is necessary.

The bottom end-of-travel latching means are usually not of this type. Consequently, the manner of operation of the latching means with which the motorized screen device is equipped, may be different.

The various described modes of execution of the method may also be applied in the case of electromechanical latches operated as a function of the positions and/or movements of the free end of the screen.

The invention claimed is:

1. A method for operating a motorized screen device (1) comprising:
   winding a screen (2) windable on a winding tube (3) whose angular position is measured by a sensor (12);
   latching a free end (4) of the screen in a defined position in which the screen is at least partially unwound from the winding tube (3), the position termed latched (P2) in the direction of winding, the latching being activated in this direction if the free end (4) of the screen previously reaches at least one position of reversal (P3), to which corresponds for the unwinding a value of angular position of the winding tube termed the position of reversal of rotation (D3), situated beyond the latched position (P2) in the direction of unwinding of the screen,
   wherein, in a mode of configuration of the latching of the screen (2), the installer proceeds merely to record the value of a chosen angular position, termed the recorded rotation reversal position (DM), this position being situated at the level of or beyond the position of reversal of rotation (D3), in the direction of unwinding of the screen (2).

2. The method of operation as claimed in claim 1, wherein, in a mode of use, when the screen (2) is driven in the direction of unwinding and when the sensor (12) measures a value equal to the value of the recorded rotation reversal position (DM), the motorized screen device (1) automatically drives the screen (2) in the direction of winding.

3. The method of operation as claimed in claim 1, wherein the value of the recorded rotation reversal position (DM) is less than a value of angular position of the winding tube termed the exit position (D4), beyond which the latching of the screen (2) is no longer activated when the screen is driven in the direction of winding.

4. The method of operation as claimed in claim 3, wherein the value of the chosen angular position (DM) is recorded after a winding displacement whose amplitude is greater than the difference between the exit position (D4) and the angular position (D2) of the winding tube corresponding to the latched position (P2) of the free end of the screen.

5. The method of operation as claimed in claim 1, wherein the recording of the value of the recorded rotation reversal position (DM) is automatically followed by a screen winding drive.

6. The method of operation as claimed in claim 1, wherein, in the mode of configuration of the latching of the screen (2), a signal for confirming recording is given, at least by a brief stoppage of the winding drive, when the free end (4) of the screen (2) has gone past the latched position.

7. The method of operation as claimed in claim 1, wherein the value of angular position of the winding tube (D2) corresponding to the latched position (P2) is measured by a screen drive torque sensor (10).

8. The method of operation as claimed in claim 1, wherein a value of angular position of the winding tube (D5) corresponding to a position of unlatching (P5) situated beyond the exit position (P4) in the direction of unwinding, is determined, in the mode of configuration of the latching of the screen and/or in the mode of use, by addition of the value of angular position (D2) of the winding tube corresponding to the latched position (P2) to a prerecorded difference value (DE).

9. A motorized screen device (1) comprising a screen (2) windable on a winding tube (3) whose angular position is measured by a sensor (12), and at least one means of latching (6) of the free end (4) of the screen (2) defining a position termed latched (P2) in the direction of winding, the latching being activated in this direction only if the free end (4) of the screen (2) previously reaches at least one position of reversal (P3), to which corresponds for the unwinding a value of angular position of the winding tube termed the position of reversal of rotation (D3), situated beyond the latched position (P2) in the direction of unwinding of the screen (2), which device comprises hardware (7, 8, 9, 10, 12) and software means for the implementation of the method of operation as claimed in claim 1.

10. The motorized screen device as claimed in claim 9, which device comprises a screen drive torque sensor (10).

* * * * *